United States Patent [19]

Harrison

[11] 3,975,919
[45] Aug. 24, 1976

[54] PIPELINE POSITIONING SYSTEM

[76] Inventor: Harry W. Harrison, Rte. 1, Box 99, Dripping Springs, Tex. 78620

[22] Filed: June 23, 1975

[21] Appl. No.: 589,441

Related U.S. Application Data

[63] Continuation of Ser. No. 514,435, Oct. 15, 1974, abandoned.

[52] U.S. Cl. .............................................. 61/108
[51] Int. Cl.² .......................................... F16L 1/00
[58] Field of Search ......................... 61/72.1–72.7, 61/63; 114/.5 R

[56] References Cited
UNITED STATES PATENTS

| | | | |
|---|---|---|---|
| 3,321,925 | 5/1967 | Shaw | 61/72.3 |
| 3,668,878 | 6/1972 | Jones | 61/72.3 |
| 3,670,510 | 6/1972 | Shaw | 61/72.3 X |
| 3,680,322 | 8/1972 | Nolan et al. | 61/72.3 |
| 3,760,595 | 9/1973 | Stewart et al. | 61/72.5 |
| 3,779,593 | 12/1973 | Neuroth | 294/86 |

*Primary Examiner*—Dennis L. Taylor
*Attorney, Agent, or Firm*—Pravel & Wilson

[57] ABSTRACT

A pipeline positioning system for controlling a pipeline portion which extends from a pipe laying vessel into a body of water wherein the pipeline portion is formed by successively adding pipe lengths on the pipe laying vessel, including first and second pipeline control stations mounted on the vessel at spaced intervals for alternately gripping, moving and releasing the pipeline portion in order to allow relative movement between the pipeline portion and the pipe laying vessel in order to continually add additional pipe lengths to the pipeline portion already laid.

19 Claims, 8 Drawing Figures

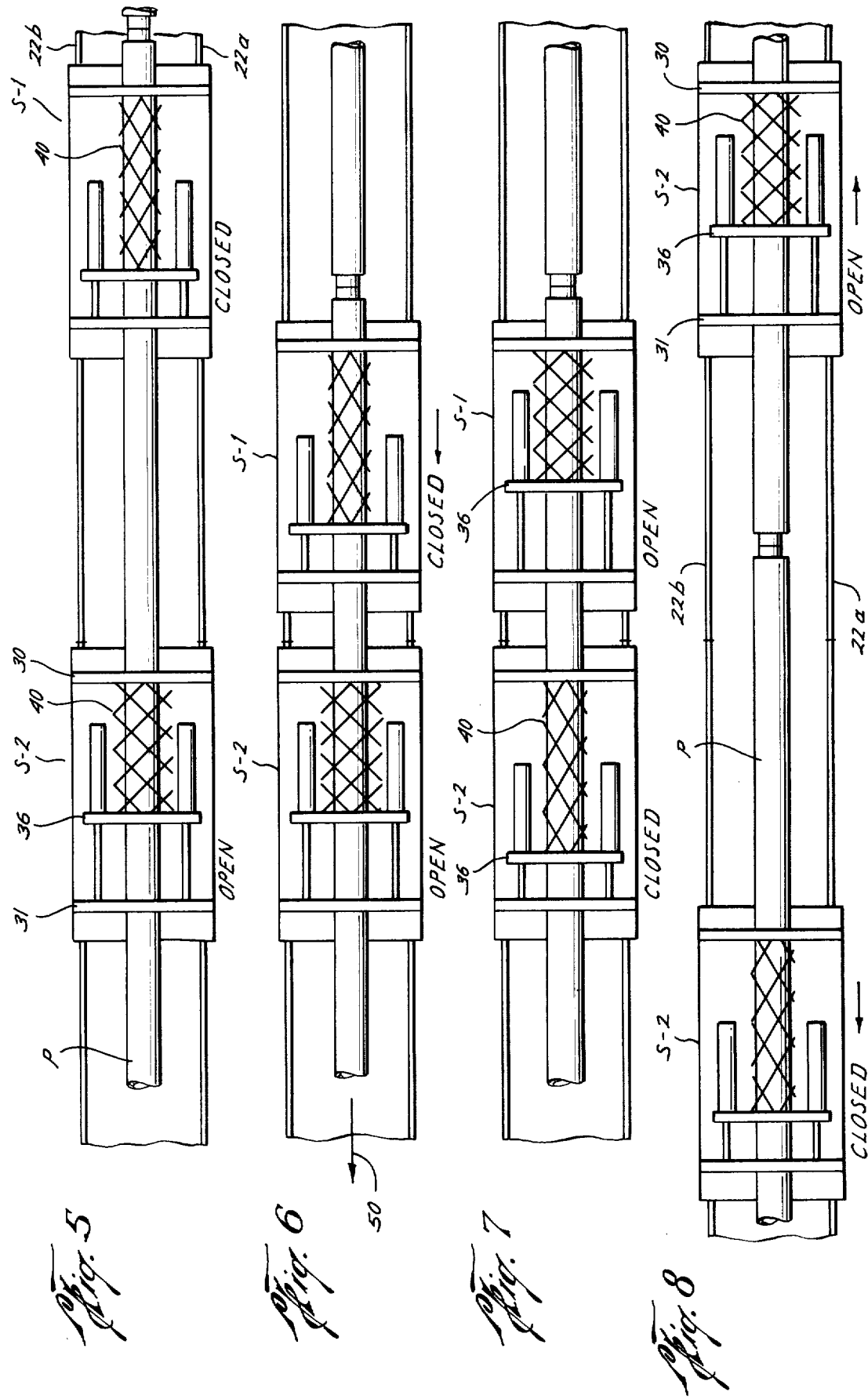

PIPELINE POSITIONING SYSTEM

This is a continuation of application Ser. No. 514,435, filed 10/15/74.

BACKGROUND OF THE INVENTION

The field of this invention is pipeline positioning systems for use on a pipe laying vessel or the like.

Pipe laying vessels such as barges are utilized to lay a pipeline along the floor of an ocean or other body of water. Such pipeline barges generally include one or more welding stations for successively welding pipe lengths to the pipeline portion already formed. Each time new pipe lengths are welded onto the already formed pipeline portion, it is necessary to move the pipeline barge out from under the new pipeline portion to provide space on the barge for the addition of more pipe lengths. This is generally accomplished by an anchor pulling system mounted at the front of the barge for pulling the barge with respect to the pipeline portion already formed in order to provide space for the alignment and welding of new pipe lengths to the already formed pipeline portion In order to accomplish this relative movement betwen the pipeline portion already formed and the pipe laying barge or other vessel, it is necessary that some type of pipeline control mechanism be mounted on the barge to continually grip and allow movement of the pipeline portion with respect to the barge, particularly when the barge is moving forward as a result of the pulling forces exerted by the anchor pulling system or the like mounted at the bow of the barge. Such devices have been known in the art as "pipeline tensioners". This is somewhat of a misnomer since the pipeline tensioners are actually gripping devices which allow the pipeline portion to be fed off of the barge as the barge moves foward, the actual tension applied to the pipeline being the result of the pulling forces exerted on the barge by the anchor pulling system.

Generally, pipe lengths used to form underwater pipelines are weight-coated with concrete or the like. It is therefore necessary to provide gripping mechanisms for gripping and controlling the movement of the pipeline with respect to the barge which will not destroy this concrete coating. Another problem involves the addition of concrete coating in the joint area after the pipe lengths are welded together; for, in order to weld pipe lengths together on the barge, the end area of the pipe lengths are not weight-coated thus exposing the metal itself for welding purposes. The exposed joint area must be weight-coated after the pipe lengths have been welded together but before the pipe lengths are lowered into the water as part of the pipeline. Generally, an annular jacket is mounted about the exposed joint area after the welding and concrete is poured into the jacket. A pipeline tensioner or gripping device should be able to grip or hold the pipeline portion under tremendous forces without damaging the annular jacket which may be aluminum or the like, and the newly formed concrete layer therein. Such pipeline tensioners or gripping devices should also be able to grip and hold the position of the already formed pipeline portion extending from the barge in spite of changes in the diameter of the pipe lengths added to the pipeline.

One pipeline tensioning device known in the art involves the use of several sets of endless conveyor type track grippers which are mounted to receive the pipeline portion already formed between the grippers for allowing movement of the pipeline portion with respect to the barge or other vessel. The use of such endless conveyor type of gripping means do not solve all of the problems which have been mentioned. For example, it is necessary for such pipeline tensioners to grip and hold the pipeline portion already formed with tremendous gripping forces; this is due to the tremendous pulling forces exerted on the barge by the anchor pulling system and to the great weight of the already formed pipeline. The utilization of endless conveyor type of grippers causes some localization of the stress, thus making it more likely to destroy or otherwise damage part of the pipeline concrete coating. In addition, the concentration of stresses in particular areas by the endless conveyor type of track means increases the likelihood of damage to the annular jackets used to support freshly poured concrete.

SUMMARY OF THE INVENTION

This invention relates to a new and improved pipeline system for mounting on a pipeline laying vessel or the like for controlling the position of a pipeline portion extending to the floor of an ocean or other body of water wherein the pipeline portion is formed by successively adding pipe lengths on the vessel. The new and improved pipeline control system includes first and second pipe control station means mounted on the vessel for alternately gripping, feeding and releasing the pipeline portion extending from the vessel to the ocean bottom. The first and second pipe control station means are mounted on the vessel at a spaced interval and act alternately to grip and allow relative movement between the barge and the pipeline portion to move the barge out from under the pipeline portion already formed.

In the preferred embodiment of this invention, the first pipe control station means includes a first grip means for gripping the pipeline portion and a first position control means for allowing relative movement between the gripped pipeline portion and the vessel as the vessel is moved forwardy with respect to the pipeline portion already formed. The first pipe control station further includes first release means for releasing the grip on the pipeline portion. The second pipe control station includes a second grip means for gripping the already formed pipeline portion prior to release thereof by the release means of the first pipe control station. The second pipe control station means further includes a second position control means for allowing relative movement between the gripped pipeline portion and the vessel as the vessel is moved further forward; and, a second release means is provided for releasing the second pipeline portion after the first grip means of the first pipe control station has again gripped the pipeline portion.

The first and second pipe control station means, in the preferred embodiment of this invention, each include a main frame assembly for mounting on the pipe laying vessel and a carriage mounted for movement with respect to the main frame assembly. A pipe gripping means is mounted on the carriage for movement with the carrier for alternately gripping and releasing the pipeline portion extending from the pipe laying vessel into the body of water; and, control means are mounted with the carriage and main frame assembly for moving the carriage along the main frame assembly in order to feed the already formed pipeline portion off of the pipe laying vessel to make space at the vessel welding stations for adding additional pipe lengths.

The pipe gripping means for the first and second pipe control station means includes a helically interwoven network of strands which form a collapsible or contracting sleeve for providing a substantially uniform circumferential gripping force on a pipeline portion mounted therein. The collapsible sleeve is movable between an expanded and a contracted position by providing relative longitudinal movement between the supported ends thereof.

BRIEF DESCRIPTION OF THE DRAWINGS

FIG. 3 is a multi-sectional view of the pipe control means of FIG. 2;

FIG. 4 is a sectional view taken along lines 4—4 of FIG. 3; and

FIGS. 5–8 are schematic views illustrating the sequential, coordinated movement of the two adjacent pipe control stations of this invention.

DESCRIPTION OF THE PREFERRED EMBODIMENT

Figure 1:
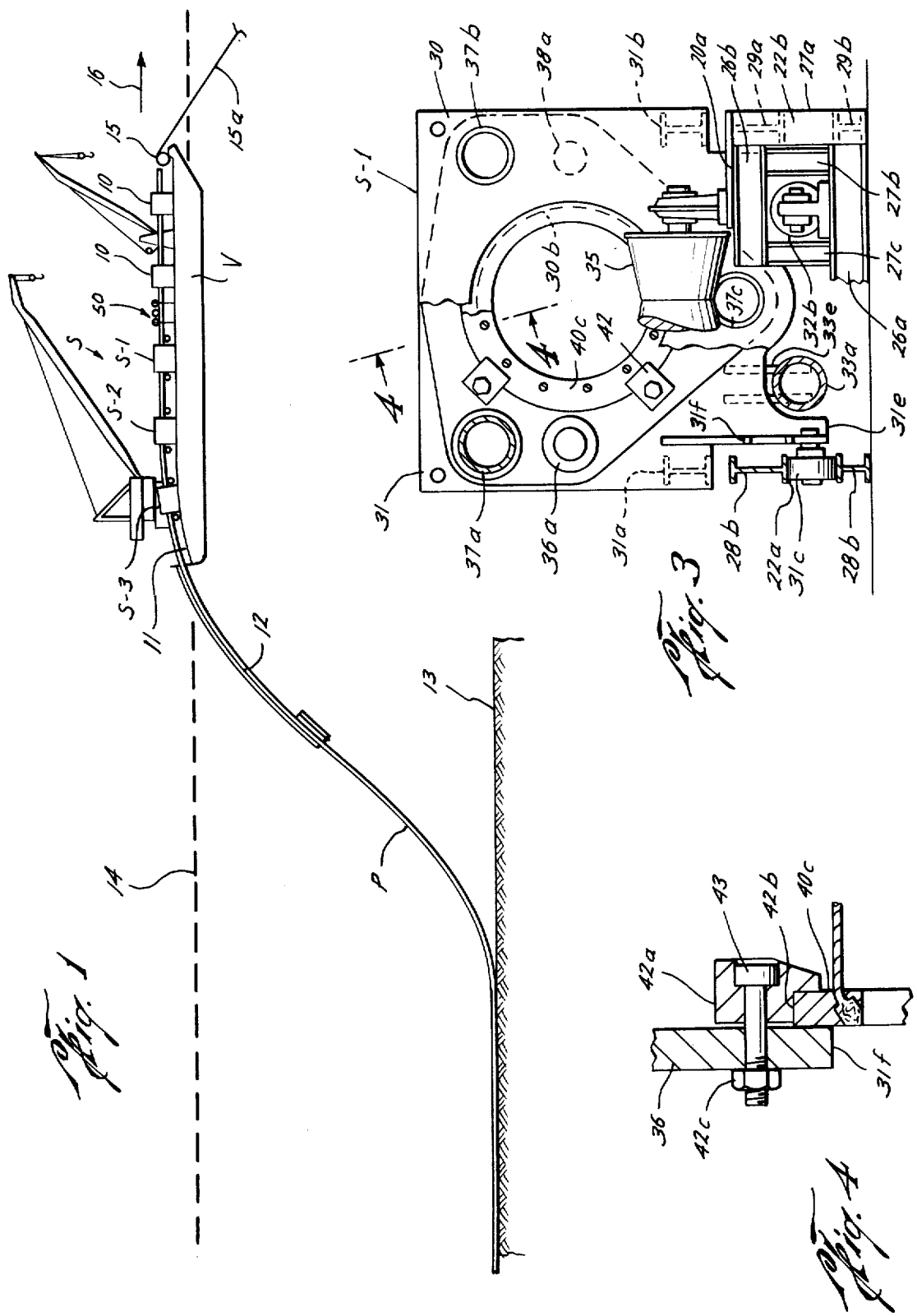
FIG. 1 illustrates an underwater pipeline laying vessel for laying an underwater pipeline.

Referring to the drawings and in particular to FIG. 1, the pipeline positioner system S of the preferred embodiment of this invention is mounted on a pipe laying vessel V for laying a pipeline P for underwater use. The vessel V may be a pipe laying barge or other such vessel which includes one or more welding stations 10 which are utilized to weld one or more pipe lengths onto the already formed pipeline portion P which is held in position by the pipeline positioning system S of this invention. The pipe laying vessel V may be any one of several known styles. In FIG. 1, the vessel V includes a gradually downwardly sloping track 11 and a pipeline stinger 12 which cooperate with the pipeline positioning system S to support the pipeline portion P which extends downwardly from the vessel V to the bottom 13 of a body of water, whose surface is represented by the scored line 14. The vessel V has mounted thereon one or mor winch-type systems 15 of a standard variety which are utilized to wind vessel pulling lines such as 15a which are anchored to the bottom 13 of the ocean or other body of water.

Typically, the vessel V is used in the following manner. The pipeline portion P which has already been formed is held in position on the vessel V by means of the pipeline positioning system S of this invention, or by pipeline tensioners known in the art. New pipe lengths are welded onto the existing pipeline portion P at the welding station such as 10. After this welding process has occurred, the winch assemblies such as 15 are activated to pull the vessel V forwardly in the direction of arrow 16 in order to make room for the pipe handling system 17 mounted thereon to place additional pipe lengths in position for welding to the pipeline portion P already formed. In order for the winch assembly 15 to move the vessel V forwardly in the direction of arrow 16, it is necessary that extremely large pulling forces, in the nature of hundreds of thousands of pounds, be exerted by the winch assemblies. Correspondingly, it is necessary for the pipe positioner system S to grip and allow controlled relative movement of the pipeline portion P with respect to the vessel V.

The pipeline positioning system S includes movable or reciprocating type gripping stations S-1 and S-2 that are mounted on the vessel V in a spaced relationship. The pipeline positioning system S further includes a third, fixed or failsafe pipeline gripping station S-3. The movable or reciprocating pipe gripping stations S-1 and S-2 are basically identical, except for their sequence of operation, and thus identical numbers and letters will be used to describe identical elements thereof.

Figure 2:
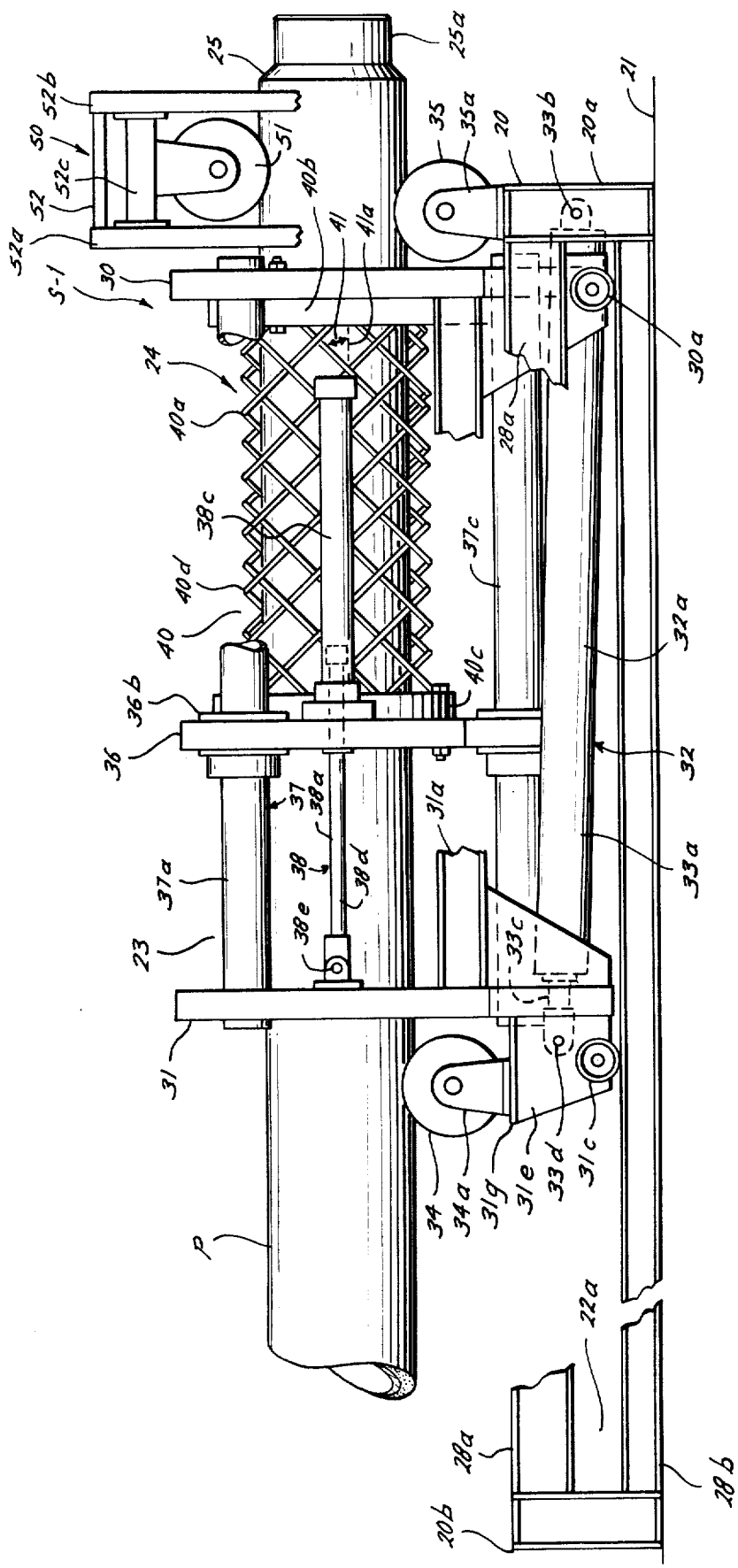
FIG. 2 is a side view of one of a pipe control station of the preferred embodiment of this invention.

Referring in particular to FIGS. 2-4, the pipe gripping station S-1 is illustrated in detail. The pipe gripping station S-1 includes a main frame assembly generally designated as 20 which is mounted onto the deck 21 of the vessel V. The main frame assembly 20 includes side tracks generally designated as 22a and 22b which mount for reciprocating movement a carrige 23. The carriage 23 has mounted thereon a pipe gripping means generally designated as 24 for alternately a and releasing the pipeline portion P for allowing movement of the pipeline portion P with respect to the vessel V. It should be noted that the pipeline portion P is weight-coated by a concrete coating 25, except at the ends 25a thereof which are exposed for welding. It is the ends 25a which eventually, when joined by welding, receive an annular jacket of aluminum or other suitable material for having concrete poured therein in order to provide a continuous concrete layer throughout the entire pipeline portion P laid on the bottom 13 of the body of water.

The main frame assembly 20 includes a front end beam structure 20a and a rear end beam structure 20b. Of course, it should be understood that the front end beam structure 20a is oriented in the same direction as the bow of the vessel V and that the rear end frame structure 20b is oriented in the same direction as the stern end of the vessel V. The front end frame structure 20a includes transverse I-beams or the like 26a and 26b which are supported on vertical support beams such as 27a, 27b and 27c. Of course, it is understood that such beams are welded or otherwise connected together in a well-known manner. The rear end frame structure 20b is basically identical to the front end frame structure 20a and will not be described in detail. The front end frame structure 20a and the rear end frame structure 20b cooperate to mount and support the side track portions 22a and 22b. The side track 22a is formed of upper and lower I-beams 28a and 28b, respectively, which are welded or otherwise suitably supported onto the vertical beams such as 27a of the front and rear frame structures 20a and 20b, respectively. Similarly, the side track portion 22b is formed of I-beams (or other suitable beams) 29a and 29b which are supported by connection to the front and rear frame structures 20a and 20b, respectively.

The carriage or trolley 23 is mounted within the main frame assembly 20 on the side tracks 22a and 22b for reciprocating movement between the front end frame structure 20a and the rear end frame structure 20b. The carriage 23 is formed by a front end support plate 30 which is attached to a rear end support plate 31 by I-beams 31a and 31b which are connected to the end plates 30 and 31 by any suitable means such as welding. The front end support plate 30 has rollers such as 30a mounted in the side tracks 22a and 22b. Similarly, the rear end support plate 31 has rollers such as 31c mounted in the side tracks 22a and 22b. Referring in particular to FIG. 3, the roller 31c is mounted by suitable bearings in a depending wheel support portion 31e of the rear end support plate 31. The position of the roller 31c may be adjusted by mounting the roller in other openings such as 31f. In this manner, the overall height of the rear end plate 31 may be adjusted with respect to the vessel deck 21. The rollers such as 30a for the front end support plate 30 are mounted in a similar manner. Therefore, the carriage 23 is mounted by means of the rollers such as 30a and 31c for reciprocating movement along the main frame side tracks 22a and 22b. The utilization of both upper and lower I-beams such as 28a and 28b for the side track such as 22a mount the carriage 23 for reciprocating movement, while at least partially holding the carriage 23 against any forces which would tend to pull the carriage 23 upwardly with respect to the vessel deck 21.

Carriage position control means generally designated as 32 are mounted with the front end frame structure 20a and with the rear end plate 31 of the carriage 23 for controlling the movement of the carriage 23 along the side tracks 22a and 22b. The carriage position control means 32 includes tandemly mounted hydraulic cylinder assemblies 32a and 32b. The hydraulic cylinder assembly 32a includes a hydraulic cylinder 33a which is mounted onto the front end frame structure 20a by a suitable pin and lug connection at 33b. A piston and rod combination 33c is mounted in a well-known manner within the cylinder 33a and is further pivotally connected to the depending wheel support portion 31e of the carriage rear end plate 31. Referring to FIG. 3, the pivotal connection between the piston and rod combinaion 33c and the depending rear end plate portion 31e is formed by a combination of a pin 33d and lugs 33e. The hydraulic cylinder assembly 32b is mounted in a identical manner to the front end frame structure 20a and to the rear end plate 31 of the carriage 23. Suitable hydraulic power controls are provided for controlling the pressure within the hydraulic cylinder assemblies 32a and 32b for thereby reciprocating the carriage 23 within the side tracks 22a and 22b. The actual hydraulic controls are not illustrated for the reason that such hydraulic controls are well known in the art.

The front end mounting plate 30 has an opening 30b therein for receiving therethrough the pipeline portion P. Similarly, the rear end mounting plate 31 has an opening substantially aligned with the opening 30b in the front end mounting plate for receiving the pipeline portion P. The rear end carriage support plate 31 has a rearwardly facing ledge 31g which is mounted onto the depending wheel support portion 31e. The ledge or platform 31g supports a V-shaped roller 34 on suitable bearing mountings 34a. The V-shaped roller 34 is identical in configuration to a roller 35 mounted by suitable bearings such as 35a onto the front end frame structure 20a. Thus the roller 35 is fixed with respect to the vessel V and the roller 34 is mounted for movement with the carriage 23. The rollers 34 and 35 cooperate to support the pipeline portion P even during reciprocation of the carriage 23. In addition, a roller assembly 50 is mounted onto the front end frame structure 20a for holding down the pipeline portion P against any moment forces tending to force the pipeline portion P upwardly with respect to the vessel deck 21. The hold down assembly 50 includes a roller 51 which is supported in position above the pipeline porton P by upright frame 52. The upright frame 52 includes vertical posts or channels such as 52a which are mounted with and extend upwardly from the front end frame structure 20a. Additional vertical posts or channels 52b extend upwardly from the vessel deck 21 and are joined with posts 52a by roller supports 52c, which support the roller 51 on a suitable bearing structure similar to 35a.

A movable actuator support plate 36 is mounted between the support end plates 30 and 31 on a carriage 23 for movement with respect to the end support plates 30 and 31. Slide means 37 including three cylindrical slide tubes 37a, 37b and 37c are mounted onto the end support plates 30 and 31 by suitable means and extend horizontally therebetween. The actuator plate 36 has openings 36a therein which align with the slide tubes and are adapted to receive them. Suitable bushings such as 36b are mounted in each of the openings and actually receive the slide tubes 37a–c such that the actuator plate 36 is mounted for slidable movement on the slide tubes 37a–c. The actuator plate 36 also has an opening aligned with the openings such as 30b in the fixed end support plates 30 and 31 for receiving the pipeline portion P.

Actuator means generally designated as 38 are mounted onto the end support plate 31 and onto the actuator plate 36 for moving the actuator plate 36 with respect to the support end plates 30 and 31. The actuator means 38 includes two hydraulic cylinder assemblies 38a and 38b which are identical except for being mounted on either side of the actuator plate 36. The hydraulic cylinder assemblies 38a and 38b each include a hydraulic cylinder 38c mounted onto the actuator, slidable plate 36 and extending laterally therefrom. A piston and rod combination 38d is mounted within the hydraulic cylinder 38c and extends into a pivotal connection at 38e with the end support plate 31. The hydraulic cylinder 38c is double acting in order to receive fluid from either end in a well-known manner, thereby causing the actuator plate 36 to move in either direction along the slide tubes 37a–37c.

The pipe gripper means 24 of the preferred embodiment of this invention is attached to the carriage end support plate 30 and to the carriage movable actuator plate 36 for gripping the pipeline portion P about an entire circumferential area thereof so that the pipeline portion P can be moved with respect to the vessel V thereby providing room for the addition of new pipe lengths at the welding stations 10. The pipe gripper means 24 includes a cartridge assembly 40 which is removably mounted onto the support plates 30 and 36 in alignment with the openings such as 30b in the support plates 30, 31 and 36. The removable cartridge assembly 40 includes a collapsible or contracting strand network 40a which is mounted onto annular mounting rings 40b and 40c, the annular mounting ring 40b being removably attached to the end support plate 30 and the annular mounting ring 40c being removably attached to the movable actuator plate 36.

The strand network 40a is formed of a series of helically interwoven cables or other suitable strands 40d which are attached to the annular mounting rings such as 40c by any suitable means. The angle of inclination 41 of the strands with respect to a line 41a parallel to the general axis of the pipeline portion P received therein is adjustable according to the degree of contraction and expansion desired by the entire strand network 40a.

The annular mounting rings 40b and 40c which support the strand network 40a are removably mounted onto the end support plates 30 and 36 by circumferentially spaced brackets 42. Referring in particular to FIGS. 3 and 4, the brackets 42 are illustrated as being mounted in a circumferentially spaced relationship about the slidable support plate 36. Each of the brackets 42 includes a bracket member 42a having an L-shaped recess 42b for actually receiving the annular ring 40c. A countersunk bolt 43 is mounted in and extends through the bracket 42a and through the slidable support plate 36 and is held in place by a suitable nut 42c. Thus whenever it is desired to change the cartridge 40, it is simply necessary to remove the circumferentially spaced brackets 42 from the support plates 30 and 36 in order to free the annular rings 40b and 40c for removal. If it should be desired to place a different size cartridge 40 having different size annular rings 40b and 40c on the plates 30 and 36, it may be necessary to adjust the position of the brackets 42. Such adjustment is within the ordinary skill of the art.

The strand network 40d forms a cylindrically-shaped sleeve or cage which is movable between an open, expanded position such as illustrated in FIG. 2 and an elongated, contracted position of reduced diameter wherein the strands 40d cooperate to grip and engage the pipeline portion P. Movement of the strand network 40a between the open or released position and the closed or gripping position is accomplished by causing movement of the actuator plate 36 by means of the hydraulic cylinder assemblies 37a and 37b. The helically interwoven strands cooperate to engage the pipeline portion P around the entire circumferential portion thereof thereby minimizing damage to the concrete coating 25. The strand network 40a is moved to a closed, gripping position of reduced diameter by movement of the annular mounting ring 40c, which is mounted on the slidable actuator support plate 36, away from the annular ring 40b, which is mounted on the support end plate 30. Conversely, movement of the slidable actuator plate 36 toward the fixed end plate 30 will cause an expansion in diameter of the strand network 40a to an open position wherein the diameter within the strand network is greater than the outside diameter of the pipeline portion P, including the concrete weight coating 25.

In operation and use, the pipe stations S-1 and S-2 are operated in sequence to alternately grip, feed and release the pipeline portion P. Referring to FIGS. 5 and 8, the pipeline stations S-1 and S-2 are shown schematically. Referring to FIG. 5, the strand network 40a of station S-1 is in a closed position and the carriage 23 is in a forward position. The hydraulic cylinders 32a and 32b are activated to allow movement of the carriage 23 from the initial forward position illustrated in FIG. 5 to the rearward position illustrated in FIG. 6.

Referring to FIG. 7, the cartridge assembly 40 for the movable station S-2 is then actuated through hydraulic cylinder assemblies 38a and 38b to move the movable actuator plate 36 for the station S-2 to an actuated position wherein the strand assembly 40a grips the pipeline portion P. The actuator support plate 36 for the station S-1 is then moved toward the stationary support end plate 30 thereby moving the strand network 40a for the station S-1 to an expanded, open position.

Referring to FIG. 8, the station S-2, which now has control of the pipeline portion P, is moved from the initial forward position of FIG. 7 to the secondary, rearward position of FIG. 8 thereby feeding the pipeline portion P in the direction of the arrow 50, out of the vessel V. Simultaneously with the feeding operation of station S-2 the hydraulic cylinders 32a and 32b for the station S-1 are suitably activated to return the carriage 23 of station S-1 to its initial, forward position. Finally, the last step in the cycle is the closing of the strand network 40a of the station S-1 and the subsequent opening of the strand network 40a of the station S-2 so that the station S-1 is again in control of the pipeline portion P. This cycle is continually repeated in order to feed the pipeline portion P off of the vessel V in order to make room for the addition of new lengths of pipe.

The pipe station S-3 is substantially identical to the stations S-1 and S-2 except that the carriage 23 is mounted in a stationary position. The station S-3 is used as a failsafe system to grip the pipeline portion P whenever necessary. Also the station S-3 can be used in conjunction with either station S-1 or S-2 to grip and release the pipeline portion P in sequence with one of said movable stations.

The cartridge assemblies 40 for the stations S-1, S-2 or S-3 may be removed and replaced with cartridge assemblies 40 of different open and closed diameters, if necessary. For example, it may be necessary to gradually reduce the diameter of the pipe used in a pipeline being laid as the pipeline approaches more shallow water such as in a bay or the like. In such situations, cartridge assemblies having smaller diameter contracted positions are placed on plates 30 and 36. Whenever the cartridge assembly 40 is changed, it may be necessary to adjust the vertical position of the end support plates 30 and 31 in order to maintain the bottom of the new diameter pipe coming therethrough at substantially the same position of the bottom of the pipe previously run through. In this manner, it will not be necessary to adjust the position of all the pipe handling rollers such as 35 on the stations S-1 or any other pipeline rollers or handling equipment utilized, which support pipe from the bottom thereof. Such an adjustment may be accomplished by utilizing the other plate support openings such as 31f to mount wheels such as 31c.

The foregoing disclosure and description of the invention are illustrated and explanatory thereof, and various changes in the size, shape and materials as well as in the details of the illustrated construction may be made without departing from the spirit of the invention. For example, the system S of this invention can be used to control movement of the pipeline portion P under circumstances other than feeding the pipline portion P outwardly. For example, the system S can be used to move the vessel V under the pipeline portion P. Or, in severe weather, the carriage 23 can be used to allow relative movement between the vessel V and the pipeline portion P in order to compensate for wave motion.

I claim:

1. A pipeline positioner system for maintaining control of a pipeline portion extending from a pipe laying vessel into a body of water, wherein said system includes one or more pipe control stations for mounting on said vessel, which stations comprise:

a main frame assembly for mounting on a pipe laying vessel;

a carriage and means mounting said carriage with said main frame assembly for movement with respect thereto;

pipe gripping means mounted with said carriage for alternately gripping and releasing said pipeline portion extending from said pipe laying vessel into said body of water, said pipe gripping means uniformly gripping said pipeline portion about a circumferential segment thereof;

control means mounted with said carriage and said main frame assembly for moving said carriage along said main frame assembly to relatively move said pipeline portion with respect to said vessel so that additional pipe lengths can be attached or removed; and said control means moving said carriage along said main frame assembly between first and second positions, said pipe gripping means being movable with said carriage between said first and second positions, and said pipe gripping means including releasable grip means for gripping said pipe in one direction of carriage movement and for releasing said pipe for carriage movement in the other direction.

2. The structure set forth in claim 1, wherein said pipe gripping means includes:

means for uniformly gripping said pipeline portion about a substantial circumferenetial segment thereof.

3. The structure set forth in claim 1, wherein said pipe gripping means includes:

an annular cartridge member and means removably mounting said cartridge member for movement with said carriage.

4. A pipeline positioner system for maintaining control of a pipeline portion extending from a pipe laying vessel into a body of water, wherein said system includes one or more pipe control stations for mounting on said vessel, which stations comprise:

a main frame assembly for mounting on a pipe laying vessel;

a carriage and means mounting said carriage with said main frame assembly for movement with respect thereto;

pipe gripping means mounted with said carriage for alternately gripping and releasing said pipeline portion extending from said pipe laying vessel into said body of water;

control means mounted with said carriage and said main frame assembly for moving said carriage along said main frame assembly to allow relative movement between said pipeline portion and said vessel;

said pipe gripping means including:

a cylindrically-shaped strand network attached to annular mounting members, said strand network being reduced in diameter in response to one of said annular mounting members being moved away from the other and increased in diameter in response to movement of said annular mounting members toward each other; and actuator means for moving one of said annular mounting members away from the other to reduce the diameter of said strand network sufficiently to grip said pipeline portion.

5. A pipeline positioner system for maintaining control of a pipeline portion extending from a pipe laying vessel into a body of water, wherein said system includes one or more pipe control stations for mounting on said vessel, which stations comprise:

a main frame assembly for mounting on a pipe laying vessel;

a carriage and means mounting said carriage with said main frame assembly for movement with respect thereto;

pipe gripping means mounted with said carriage for alternately gripping and releasing said pipeline portion extending from said pipe laying vessel into said body of water;

control means mounted with said carriage and said main frame assembly for moving said carriage along said main frame assembly to allow relative movement between said pipeline portion and said vessel; and said pipe gripping means including, a helically interwoven strand network adapted to receive said pipeline portion, said strand network being movable between an expanded position in which said pipeline portion is movable therethrough and a contracted position in which said strand network grips said pipeline portion.

6. The structure set forth in claim 5, including:

actuator means for moving said strand network between said expanded and contracted positions.

7. The structure set forth in claim 5, including:

said helically interwoven strand network forming an expandable sleeve for gripping and releasing said pipeline portion.

8. The structure set forth in claim 5, including:

a stationary end member attached to said strand network and mounted for movement with said carriage; and a movable end member attached to said strand network and means mounting said movable end member onto said carriage for movement with respect to said stationary end member for moving said strand network between said expanded and contracted positions.

9. The structure set forth in claim 1, including:

said main frame assembly includes a track;

said carriage being mounted for movement in said track; and power means for controlling the movement of said carriage along said track.

10. The structure set forth in claim 9, wherein said power means includes:

a double acting hydraulically operated cylinder assembly attached to said main frame assembly and to said carriage for moving said carriage.

11. The structure set forth in claim 1, including:

said pipe gripping means gripping said pipeline portion as said control means allows movement of said carriage and pipeline portion attached therewith toward the stern of said vessel; and said pipe gripping means thereafter releasing said pipeline portion and said control means moving said carriage toward said bow in order to return said carriage to its initial position.

12. The structure set forth in claim 5, including:

actuator means mounted at the ends of said strand network for providing relative longitudinal movement between said ends to vary the diameter of said strand network.

13. A system for mounting on a pipe laying vessel or the like for controlling the position of a pipeline portion extending to the floor of an ocean or other body of water, wherein said pipeline portion is formed by successively adding pipe lengths on said vessel, comprising:
  a first pipe control station means for gripping, feeding and releasing of the pipeline portion extending from said vessel to the ocean bottom; and
  a second pipe control station means spaced from said first pipe control station means acting in sequence with said first pipe control station means for alternately controlling the position of sid pipeline portion extending from said vessel to the ocean floor as said vessel is moved forward to add additional pipe lengths.

14. The system set forth in claim 13, wherein said first pipe control station means includes:
  first grip means for gripping said pipeline portion;
  first position control means for allowing relative movement between said gripped pipeline portion and said vessel as said vessel is moved forward; and
  first release means for releasing said grip on said pipeline portion.

15. The system set forth in claim 14, wherein said second pipe control station includes:
  second grip means fo gripping said pipeline portion prior to release thereof by said first release means;
  second position control means for allowing relative movement between said gripped pipeline portion and said vessel as said vessel is moved forward; and
  second release means for releasing said grip on said pipeline portion after said first grip means has gripped said pipeline portion.

16. The structure set forth in claim 1, wherein said carriage includes:
  first and second end support members and means for fixedly connecting said end support members to each other; and
  an actuator support member and means mounting said actuator support member between said end support members for relative movement with respect thereto, said actuator support member cooperating with one of said end support members to mount said pipe gripping means onto to said carriage.

17. The structure set forth in claim 16 including:
  power means for moving said actuator support member relatively with respect to said end support members in order to cause said pipe gripping means to alternately grip and release said pipeline portion.

18. A system for mounting on a pipe laying vessel or the like for controlling the position of the pipeline portion extending toward the floor of an ocean or other body of water, comprising:
  a first pipe control station means for sequentially gripping, moving and releasing a pipeline portion extending from said vessel to the ocean floor, said first pipe control station means including:
  first grip means for gripping said pipeline portion;
  first position control means for relatively moving said pipeline portion with respect to said vessel; and
  first release means for releasing said grip on said pipeline portion; and
  a second pipe control station means spaced from said first pipe control station means and acting in sequence with said first pipe control station means for alternately controlling the position of said pipeline portion, said second pipe control station means including the following elements:
  second grip means for gripping said pipeline portion prior to release thereof by said first release means;
  second position control means for relatively moving said gripped pipeline portion with respect to said vessel; and
  second release means for releasing said grip on said pipeline portion after said first grip means has gripped said pipeline portion.

19. The structure set forth in claim 18, including: a third pipe control station means for cooperating with said first and second pipe control stations to grip said pipeline porton prior to the release thereof by said first and second pipeline station means.

* * * * *